INVENTORS
DAVID KUSHNER
CARL A. LISTL
BY
OSTROLENK, FABER, GERB & SOFFEN
ATTORNEYS

INVENTORS
DAVID KUSHNER
CARL A. LISTL
BY
OSTROLENK, FABER, GERB & SOFFEN
ATTORNEYS

United States Patent Office 3,339,104
Patented Aug. 29, 1967

3,339,104
SOLID STATE SWITCH
David Kushner, Old Bethpage, and Carl A. Listl, Forest Hills, N.Y., assignors to Kollsman Instrument Corporation, Elmhurst, N.Y., a corporation of New York
Filed Nov. 5, 1964, Ser. No. 409,224
4 Claims. (Cl. 315—55)

This invention relates to a novel switching device using solid state elements wherein switching action is accomplished without mechanical closure or separation of electrical contacts.

In accordance with the invention, the switch structure is provided with the mechanically operable operating means connected to a suitable transducer such as a piezoelectric body which will generate a voltage responsive to the actuation of the operating means.

The output signal of the transducer is then used to operate a suitable bi-stable type circuit which will then be operated from a first conduction state to a second conduction state as between a power conducting condition to a non-power conducting condition.

In combination with this novel arrangement, the operating member, which could be a flat plate, may be provided with an electroluminescent material which is energized to a luminescent condition responsive to the energization of the output circuit controlled by the novel switching device.

Accordingly, a primary object of this invention is to provide a novel switching device which eliminates the need for mechanical closure and separation of electrical contacts.

Another object of this invention is to provide a novel switching device having a mechanical input operating motion which eliminates electrical contacts.

Yet another object of this invention is to provide a novel solid state switching device which includes an electroluminescent panel as a portion of the operating mechanism, and which is energized when the switching device is turned to one of its predetermined conditions.

These and other objects of the invention will become apparent from the following description when taken in connection with the drawings, in which.

Figure 1:
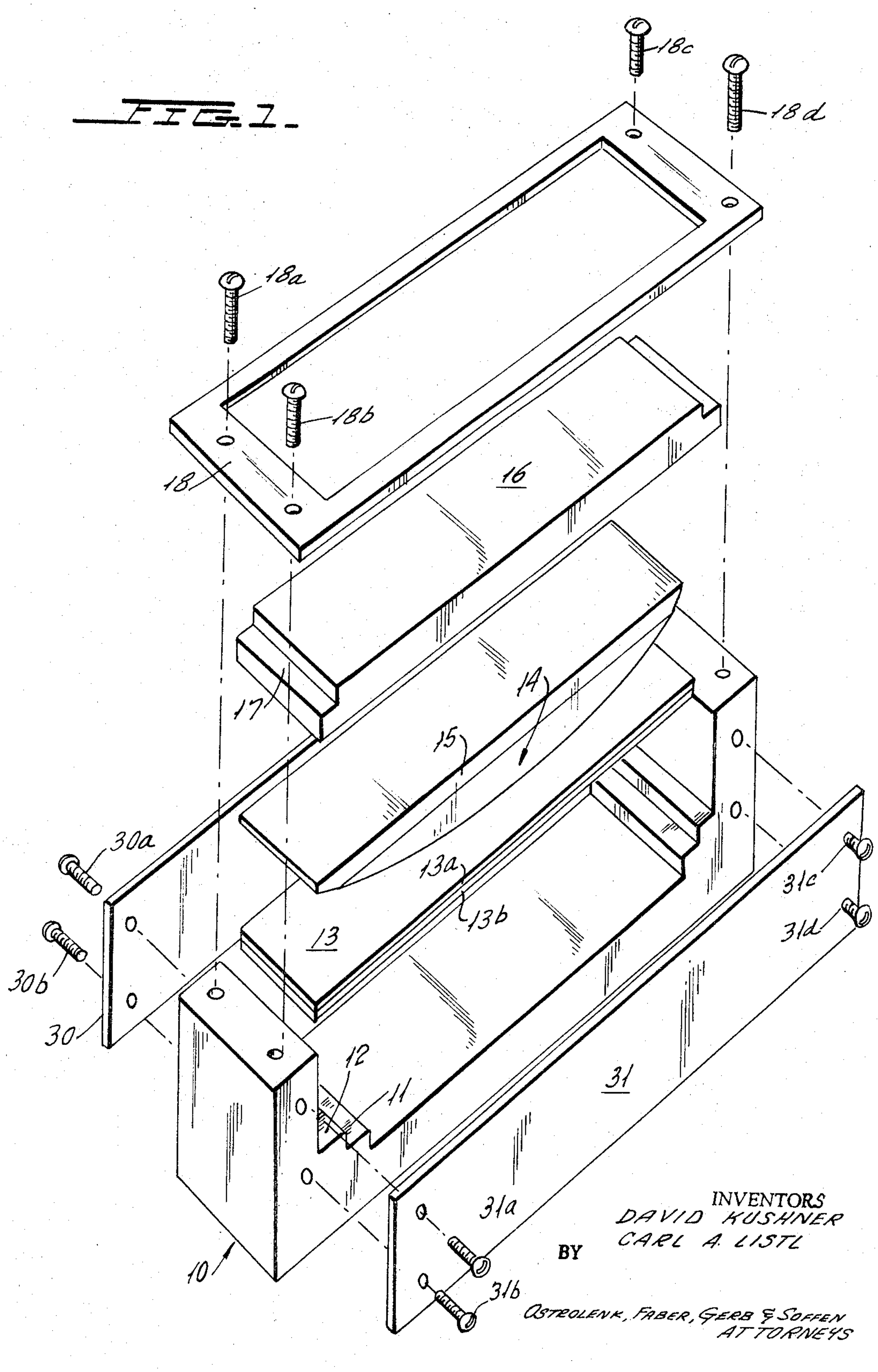
FIGURE 1 shows an exploded perspective view of a switching device made in accordance with the invention.
Figure 3A:
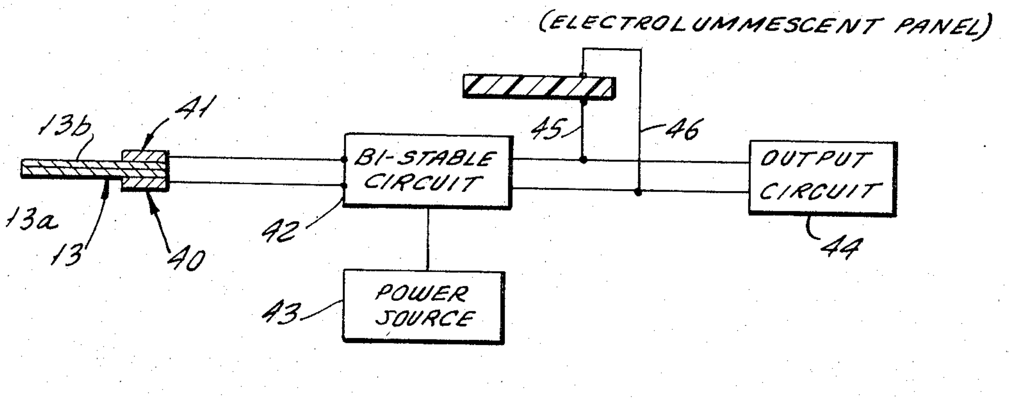
FIGURE 3 illustrates the output voltage characteristics as a function of time for the transducer plate of FIGURES 1 and 2 responsive to a bending strain applied to the plate.
Figure 2:
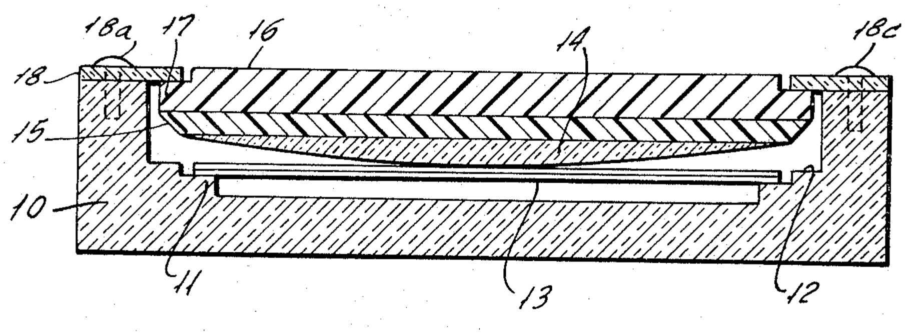
FIGURE 2 is a side cross-sectional view of the assembled arrangement of FIGURE 1.

FIGURE 3*a* schematically illustrates the manner in which the structure of FIGURES 1 and 2 can be connected to an output circuit shown in block diagram form including an electroluminescent panel.

Figure 4:
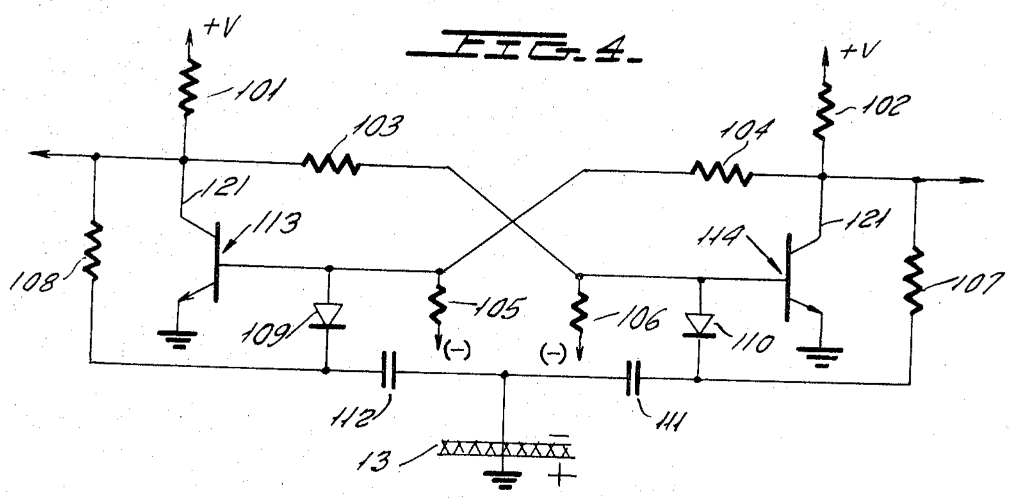

FIGURE 4 illustrates the device of FIGURES 1 and 2 in combination with a novel output circuit.

Figures 5, 6:
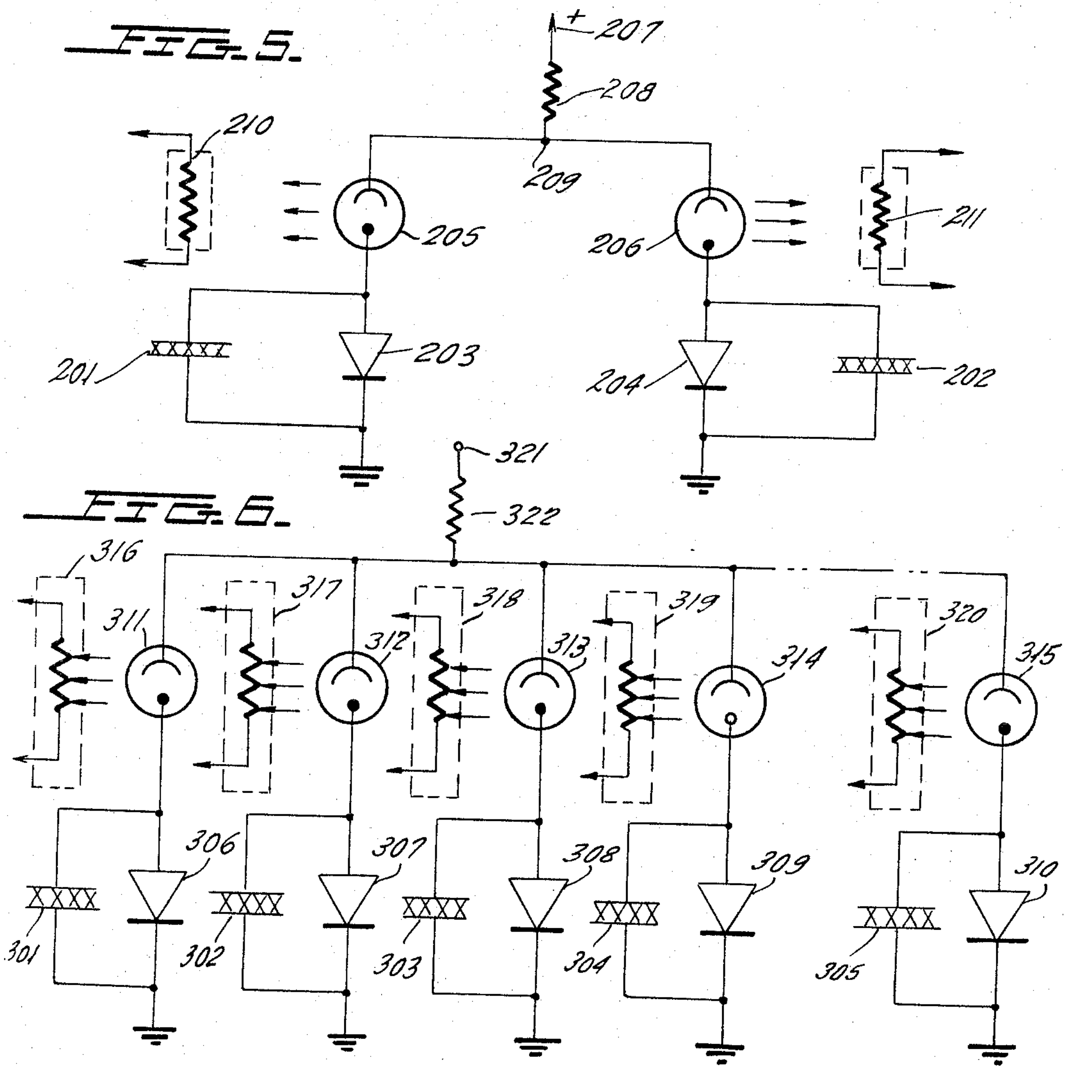

FIGURE 5 illustrates an alternate output circuit.

FIGURE 6 illustrates a still further embodiment of an output circuit.

Referring first to FIGURES 1 and 2, we have illustrated therein a housing structure 10 which may be of insulation material and which is provided with first and second internal shelves 11 and 12. The lower shelf 11 receives the two end edges of a piezoelectric element 13 whereby pressure on the center of element 13 will cause it to flex. Thus, the side edges of member 13 are not confined, but are free to move downwardly. A pressure plate 14 is then provided immediately atop the piezoelectric element 13, and has a rounded surface adapted to apply pressure to the central portion of plate 13.

While the following description shows the use of a piezoelectric type transducer 13, it will be apparent that any other type transducer could be used.

An electroluminescent panel 15 is then carried directly on pressure plate 14. A transparent or translucent operating plate 16 having an extending flange 17 is then placed atop electroluminescent plate 15, and is captured by the upper plate 18 which is secured to body 10 as by screws 18*a*, 18*b*, 18*c* and 18*d* and overlies flange 17 of translucent or transparent plate 16.

The enclosure is then completed by two side walls 30 and 31 (FIGURE 1) which are secured to housing 10 as by screws 31*a*, 31*b*, 31*c* and 31*d* for wall 31, and similar screws such as screws 30*a* and 30*b* for wall 30.

The piezoelectric element 13 is arranged in the so-called "bimorph" arrangement and consists of two sheets 13*a* and 13*b* (FIGURE 1) of piezoelectric material which are cemented together along their adjacent faces. As is well known in the art, when such an element is slightly flexed, the inner strip will be subjected to compressive forces, while the outer strip will be subjected to tensile forces. Since the materials are piezoelectric, the application of these forces will cause an electric charge to be developed on the faces of the elements as evidenced by appearance of a voltage across each sheet. The two sheets are oppositely poled, and generate voltages of opposite polarity when subjected to similar forces. Therefore, when the element 13 is flexed, the voltage across the two outer faces will be additive in polarity, so that an output voltage, which is the sum of the outputs of the two individual sheets, can be taken from suitable terminals across the opposite faces of the element.

Figure 3:
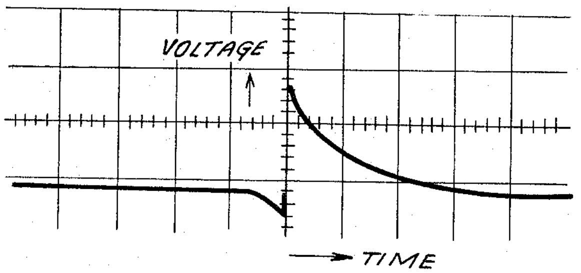

The piezoelectric element 13 of FIGURES 2 and 3 may specifically be fabricated of lead-titanate zironate ceramic, well known to those skilled in the art, and commercially available.

FIGURE 3 illustrates a typical voltage output waveform responsive to a bending action of element 13 wherein the vertical scale is of the order of 50 volts between the scale lines, while the horizontal scale is of the order of 0.1 second between the graph lines.

In the measurement made to obtain the chart of FIGURE 3, a pressure in the range of 6 to 8 ounces was slowly applied and then quickly removed from the piezoelectric element, whereby the element developed first a negative voltage pulse and then an extremely rapidly rising output voltage pulse which decayed toward zero as the generated charge was dissipated.

The principle of the present invention is to utilize this generated output pulse to operate a bi-stable circuit whereby a completely solid state switching arrangement can be provided. Thus, in order to operate a switching arrangement, pressure is applied to plate 16 of FIGURES 1 and 2. This pressure is then transmitted through the electroluminescent panel 15 and pressure plate 14 which causes the piezoelectric element 13 to bend. This bending action then generates an output voltage which can operate a suitable bi-stable circuit from a non-conducting condition to a conducting condition. This is schematically illustrated in FIGURE 3*a* where the piezoelectric element 13 has its output electrodes 40 and 41 connected to the input of a suitable bi-stable circuit 42. The bi-stable circuit controls the application of power from a power source 43 to an output circuit 44.

Moreover, and in accordance with the invention, the output of bi-stable circuit 42 can be connected to the input leads 45 and 46 of the electroluminescent panel 15, whereupon the panel will be illuminated and visible through the transparent or translucent plate 16 to indicate that plate 16 has been depressed and the circuit 44 has been energized.

A subsequent application of pressure to plate 16 for turning the circuit off will then transmit a bending stress to piezoelectric body 13 which will again generate an output pulse to cause the bi-stable circuit 42 to return to its original and off condition, whereupon the circuit is turned off and the electroluminescent panel 15 is extinguished.

FIGURE 4 illustrates a typical type of bi-stable circuit which can be driven by piezoelectric element 13 or any other suitable transducer arrangement. More specifically, FIGURE 4 illustrates a conventional Eccles-Jordan bi-stable circuit (flip-flop) which includes resistors 101 through 106 and transistors 113 and 114. The piezoelectric element 13 is connected, as schematically illustrated in FIGURE 4, whereupon a negative pulse resulting from the application of pressure to piezoelectric element 13 is coupled through capacitors 111 and 112 and diodes 109 and 110 to the flip-flop circuit.

The resistors 107 and 108 serve as steering resistors which bias diodes 109 and 110 such that the negative pulse is always applied to the base of the conducting transistor, thus causing the flip-flop to reverse its state. Clearly, each actuation of piezoelectric element 13 will cause the flip-flop to reverse its conduction state whereupon potentials at the collector terminals of transistors 113 and 114 (terminals 120 and 121, respectively) may be used to control external loads in any desired manner.

While FIGURE 4, in connection with the arrangement of FIGURE 2, provides a switching device whose state of conduction is changed each time pressure is applied to pressure plate 16, it is also possible to provide two such switching devices of FIGURE 2, one of which will always turn a circuit on and the other of which will always turn a circuit off.

The output circuit for such a device is schematically illustrated in FIGURE 5 wherein two separate piezoelectric elements 201 and 202, which have respective operating housings, are used with device 201 always turning an output circuit on and device 202 always turning the output circuit off.

In the circuit arrangement of FIGURE 5, each of elements 201 and 202 are connected directly across diodes 203 and 204, respectively, which are connected in series with neon lamps 205 and 206, respectively. A supply voltage 207 is then provided which has a value less than the firing voltage of neon lamps 205 and 206, but greater than their sustaining voltage. Thus, if either lamp is turned on, it will stay on, but neither can spontaneously ignite.

If it is now desired to turn on an output circuit, pressure is applied to the assembly associated with device 201, whereupon a voltage is generated in the reverse direction across diode 203 which adds in polarity to the voltage at terminal 207. This increase in voltage is sufficient to fire neon tube 205, whereupon after firing and the decrease of output voltage of device 201, the sustaining voltage of tube 205 is less than the voltage available from source 207. At the same time, a current surge flows through resistor 208 causing a drop in voltage at point 209 which extinguishes lamp 206 which is presumed to previously have been lit.

The two stable states of the circuit of FIGURE 5 may now be used to control an external load. One convenient manner for accomplishing this is illustrated in FIGURE 5 wherein each neon tube 205 and 206 are located adjacent respective photoconductive resistors 210 and 211. Thus, when either of neon tubes 205 or 206 are illuminated, the resistance of its respective photoconductive resistor will be very low, while when the tubes are extinguished, the resistance of their respective photoconductive resistors will be very high.

The circuit arrangement of FIGURE 5 can be extended to any desired number of actuating transducers and respective current paths controlled thereby. Thus, in FIGURE 6, a plurality of control devices schematically illustrated by piezoelectric elements 301 through 305, connected across respective diodes 306 and 310, respectively, control the ignition of neon tubes 311 through 315, respectively. The neon tubes 311 through 315 are then associated with photoconductive resistors 316 through 320, respectively.

A suitable voltage 321 which is connected to each of the tubes through resistor 322 is then provided again having a voltage magnitude greater than the sustaining voltage of any of the tubes 311 through 315, but lower than the ignition voltage of any of tubes 311 through 315.

It is to be clearly understood that devices 301 through 305 are each provided with their own respective assemblies, as illustrated in FIGURES 1 and 2.

In operation, and when any piezoelectric elements is actuated, its associated neon tube will be ignited and will remain on in the manner described with reference to FIGURE 5. At the same time, any other lamp which may have been lit will be extinguished, whereby only one lamp can be lit at any one time with each actuation of the switch latching its corresponding lamp on and extinguishing all others.

Should the electroluminescent panel 15 be provided for each of the switch assemblies, it will be apparent that this will provide an indication of which tube has been ignited and which circuit is in a conduction condition.

Although this invention has been described with respect to its preferred embodiments, it should be understood that many variations and modifications will now be obvious to those skilled in the art, and it is preferred therefore that the scope of the invention be limited not by specific disclosure herein, but only by the appended claims.

The embodiments of the invention in which an exclusive privilege or property is claimed are defined as follows:

1. In combination; a fixed mechanical to electrical transducer, a pressure plate adjacent said fixed transducer and movable to place said fixed transducer in stress, an electroluminescent panel mounted on said pressure plate, a power source and a bi-stable circuit; said transducer and said electroluminescent panel each having a pair of terminals; said bi-stable circuit having a pair of input terminals, power supply terminals, and a pair of output terminals; said power source connected to said power supply terminals of said bi-stable circuit; said pair of terminals of said transducer being connected to said pair of input terminals of said bi-stable circuit; whereby successive strains applied to said transducer causes the successive generation of output signals at said pair of terminals of said transducer; said successive output signals causing the successive changing of the conduction state of said bistable circuit; said pair of terminals of said electroluminescent panel being connected to said output terminals of said bi-stable circuit.

2. In combination; a fixed mechanical to electrical transducer, an electroluminescent panel pressure plate adjacent said fixed transducer and movable to place said fixed transducer in stress, a power source and a bi-stable circuit; said transducer and said electroluminescent panel each having a pair of terminals; said bi-stable circuit having a pair of input terminals, power supply terminals and a pair of output terminals; said pair of terminals of said transducer being connected to said pair of input terminals of said bi-stable circuit, said power source connected to said power supply terminals of said bi-stable circuit; said pair of terminals of said electroluminescent panel connected to said output terminals of said bi-stable circuit; whereby successive strains applied to said transducer means causing the successive generation of output signals at said transducer pair of terminals; said successive output signals causing the successive changing of the conduction state of said bi-stable circuit thereby to successively change the luminescent output of said electroluminescent panel.

3. A switching device comprising the combination of a housing, elongated mechanical to electrical transducer means in said housing, pressure plate means in said housing, a power source and a bi-stable output circuit; said housing having an opening therein; the interior surface of said opening having at least one support projection therein for receiving one surface of said elongated transducer means whereby said elongated transducer means is supported at at least one end thereof said pressure plate means being captured within said opening in said housing and adjacent the opposite surface of said one surface of said elongated transducer means; said pressure plate having projection means engaging said opposite surface of said elongated transducer means at a position spaced from said support projection in said opening whereby the application of pressure to said pressure plate toward said elongated transducer means stresses said elongated transducer means; said pressure plate extending to the outer surface of said housing; said elongated transducer means having output terminals; said bi-stable output circuit having power supply terminals; input terminals and output terminals; said power source connected to said power supply terminals; said output terminals of said transducer being connected to said input terminals of said bi-stable output circuit whereby successive strains applied to said transducer means causes the successive generation of output signals at said transducer output terminals; said successive output signals causing the successive changing of the conduction state of said bi-stable output circuit; and an outer electroluminescent plate facing outwardly of said opening and connected across the outer surface of said pressure plate; said electroluminescent plate having a pair of input terminals; said pair of input terminals of said electroluminescent plate connected to said output terminals of said bi-stable output circuit.

4. The device substantially as set forth in claim 3 wherein said elongated transducer means comprises a flat sheet defining a bimorph type transducer.

References Cited

UNITED STATES PATENTS

| | | | |
|---|---|---|---|
| 2,248,574 | 7/1941 | Knight | 317—144 |
| 2,640,889 | 6/1953 | Cherry | 200—87 |
| 3,212,080 | 10/1965 | Gurian | 340—330 |

JOHN W. HUCKERT, *Primary Examiner.*

D. O. KRAFT, R. F. POLISSACK, *Assistant Examiners.*